US008531683B2

(12) United States Patent
Tamura

(10) Patent No.: US 8,531,683 B2
(45) Date of Patent: Sep. 10, 2013

(54) IMAGE FORMING DEVICE, IMAGE FORMING METHOD AND STORAGE MEDIUM

(75) Inventor: Hirokazu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 12/427,432

(22) Filed: Apr. 21, 2009

(65) Prior Publication Data

US 2010/0128295 A1 May 27, 2010

(30) Foreign Application Priority Data

May 8, 2008 (JP) ................................ 2008-122623

(51) Int. Cl.

| | |
|---|---|
| ***G06K 15/00*** | (2006.01) |
| ***G06K 15/12*** | (2006.01) |
| ***H04N 1/40*** | (2006.01) |
| ***B41J 2/385*** | (2006.01) |
| ***G03G 13/04*** | (2006.01) |
| ***G01D 15/14*** | (2006.01) |

(52) U.S. Cl.
USPC .......... 358/1.12; 358/1.7; 358/3.24; 347/115; 347/129; 347/224

(58) Field of Classification Search
USPC ................. 347/115, 129, 224; 358/1.7, 3.24, 358/3.26, 504, 501, 540
See application file for complete search history.

(56) References Cited

U.S. PATENT DOCUMENTS

| | | | | |
|---|---|---|---|---|
| 7,379,152 | B2 * | 5/2008 | Katayama et al. | 355/52 |
| 2006/0119895 | A1 * | 6/2006 | Takata et al. | 358/3.26 |
| 2006/0226338 | A1 | 10/2006 | Tojima et al. | |
| 2009/0097072 | A1 | 4/2009 | Tamura | |

FOREIGN PATENT DOCUMENTS

| | | |
|---|---|---|
| JP | 4326380 | 11/1992 |
| JP | 2002-116394 | 4/2002 |
| JP | 2003-241131 | 8/2003 |
| JP | 2004-170755 | 6/2004 |
| JP | 2006-301030 | 11/2006 |

OTHER PUBLICATIONS

U.S. Appl. No. 12/479,547, filed Jun. 5, 2009. Applicants: Yano, et al.

* cited by examiner

*Primary Examiner* — Twyler Haskins
*Assistant Examiner* — Justin Katzwhite
(74) *Attorney, Agent, or Firm* — Fitzpatrick, Cella, Harper & Scinto

(57) ABSTRACT

A problem of the present invention is to provide an image forming device which can minimize density unevenness due to interpolation processing. For solving the above problem, an image forming device according to the present invention is an image forming device including printing unit for printing an image by scanning a photosensitive body comprising correcting unit for correcting a position in which the image is printed, wherein the correcting unit outputs one of a data of a line of interest, a data of a line adjacent to the line of interest, and a data of an intermediate value between the line of interest and the line adjacent to the line of interest in accordance with a pixel shift amount and a main scan pixel position, and the printing unit scans the photosensitive body based upon the outputted data.

3 Claims, 17 Drawing Sheets

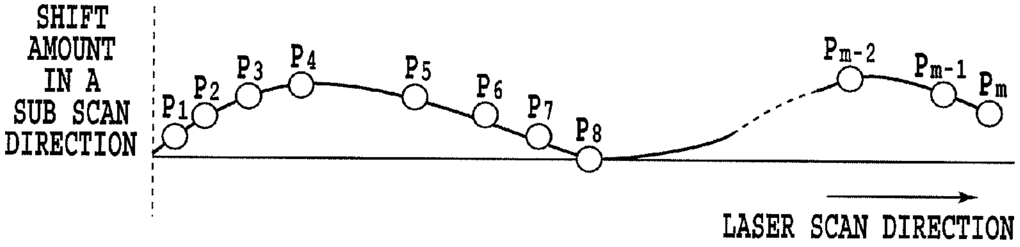
FIG.9A
| LINE CHANGING POINT | $P_1$ | $P_2$ | $P_3$ | $P_4$ | $P_5$ | $P_6$ | $P_7$ | $P_8$ | ........ | $P_{m-2}$ | $P_{m-1}$ | $P_m$ |
|---|---|---|---|---|---|---|---|---|---|---|---|---|
| DIRECTION | ↑ | ↑ | ↑ | ↓ | ↓ | ↓ | ↓ | ↑ | ........ | ↓ | ↓ | - |
FIG.9B
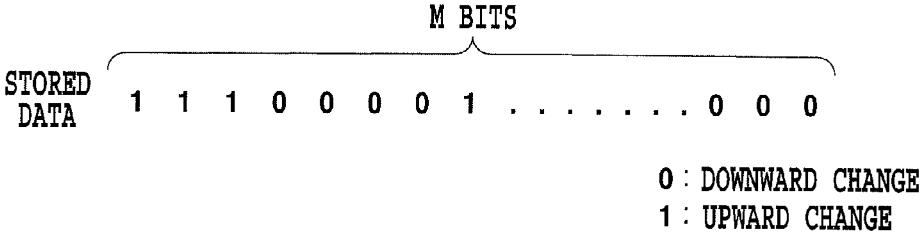
FIG.9C

| | | |
|---|---|---|
| -1 | -1 | -1 |
| 0 | 0 | 0 |
| 1 | 1 | 1 |

| | | |
|---|---|---|
| 1 | 1 | 1 |
| 0 | 0 | 0 |
| -1 | -1 | -1 |

FIG.11

FIG.15A INCLINATION SHIFT AMOUNT
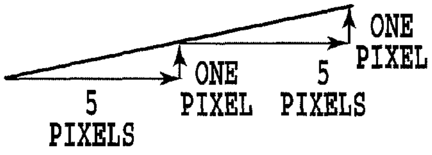
FIG.15B BIT MAP IMAGE (BEFORE TONE CORRECTION)
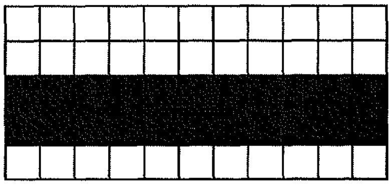
FIG.15C CORRECTION BIT MAP IMAGE
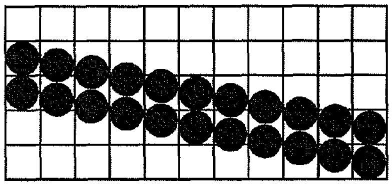
FIG.15D BIT MAP IMAGE (AFTER TONE CORRECTION)
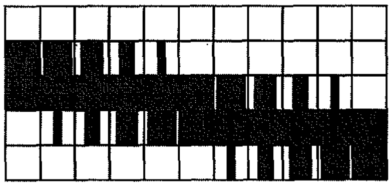
FIG.15E EXPOSURE IMAGE
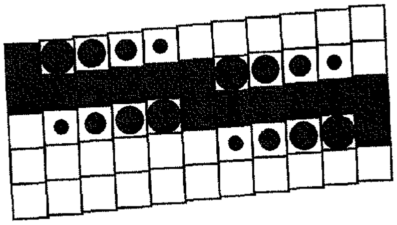

IMAGE FORMING DEVICE, IMAGE FORMING METHOD AND STORAGE MEDIUM

BACKGROUND OF THE INVENTION

1. Field of the Invention

The present invention relates to an image forming device, an image forming method and a storage medium.

2. Description of the Related Art

An electronic photograph system is known as an image printing system used in a color image forming device such as a color printer or a color copying machine. The electro photograph system is designed to form a latent image on a photosensitive drum using a laser beam and develop the latent image by a charged color material (hereinafter, refer to a toner). Printing of an image is carried out by transferring and fixing the developed image by the toner onto a transfer paper.

In recent years, a color image forming device of a tandem system has been increasing, which is provided with developing machines and photosensitive drums each number of which is the same as the color number of the toner for achieving a high speed in image forming and sequentially transfers images in different colors onto an image carrier belt or a print medium. It is known that in this color image forming device of the tandem system, there exist plural factors causing a registration shift, and therefore, various measures against the respective factors are proposed.

One of the factors is unevenness or a mounting position shift of a lens in a deflection scan device and a mounting position shift of the deflection scan device to a color image forming device body. Caused by this position shift, an inclination or a curve in a scan line is generated and a degree of the curve (hereinafter, refer to a profile) differs in each color, creating a registration shift.

The profile has a characteristic which differs in each image forming device, that is, each printing engine and further, in each color. Examples of the profile are shown in FIGS. 13A, 13B, 13C and 13D. In FIGS. 13A, 13B, 13C and 13D, a lateral axis shows a main scan direction position in the image forming device. A line 1300 linearly expressed in the main scan direction shows an ideal characteristic free of a curve. In addition, each of a line 1301, a line 1302, a line 1303 and a line 1304 shown in a curve shows a profile in each color. The characteristic of cyan (C) is shown in the line 1301, the characteristic of magenta (M) is shown in the line 1302, the characteristic of yellow (Y) is shown in the line 1303 and the characteristic of black (K) is shown in the line 1304. A longitudinal axis shows a pixel shift amount in a sub scan direction to the ideal characteristic. As shown in FIGS. 13A, 13B, 13C and 13D, a changing point of the curve differs in each color, and this difference appears as a registration shift in the image data after fixed.

As a method of handling the registration shift, Japanese Patent Laid-Open No. 2002-116394 describes a method in which in an assembling process of a deflection scan device, a magnitude of a curve in a scan line is measured by using an optical sensor and a lens is mechanically rotated to adjust the curve in the scan line, and thereafter, the lens is fixed by an adhesive material.

In a method according to Japanese Patent Laid-Open No. 2003-241131, in a process of mounting a deflection scan device to a color image forming device body, a magnitude of an inclination in a scan line is measured by using an optical sensor. Thereafter, the deflection scan device is mechanically inclined to adjust the inclination in the scan line, and then, is mounted to the color image forming device body.

Further, each of Japanese Patent Laid-Open No. 2004-170755 and Japanese Patent Laid-Open No. H04-326380 (1992) describes a method in which magnitudes of an inclination and a curve in a scan line are measured by using an optical sensor and the bit map image data are corrected to cancel out the magnitudes, forming the corrected image. In this method, since the registration shift is electrically corrected by processing the image data, a mechanical adjustment member or an adjustment process on assembly becomes unnecessary. In consequence, it is possible to downsize the color image forming device and also the registration shift can be handled less expensively than in each method described in Japanese Patent Laid-Open No. 2002-116394 and Japanese Patent Laid-Open No. 2003-241131. This electrical correction of the registration shift is classified into correction of one pixel unit and correction of less than one pixel. The correction of one pixel unit, as shown in FIG. 14, offsets the pixel per one pixel unit in a sub scan direction in accordance with correction amounts of the inclination and the curve. It should be noted that in the flowing description, the offset position refers to "a line changing point". That is, in FIG. 14(*a*), $P_1$ to $P_5$ correspond to line changing points.

The correction of less than one pixel, as shown in FIGS. 15A, 15B, 15C, 15D and 15E, is made in such a manner as to adjust a tone value of a bit map image data with a pixel before or after a sub scan direction by a laser light volume adjustment or PWM (Pulse Width Modulation). That is, in a case where the scan line is curved in an upper direction according to a profile characteristic as shown in FIG. 15A, the bit map image data before the tone correction is handled in the sub scan side in a direction reverse to a direction shown by the profile. By performing the correction of less than one pixel with this method, it is possible to eliminate an unnatural step in a line changing point boundary generated due to the correction of one pixel unit to achieve smoothness of an image.

In addition, Japanese Patent Laid-Open No. 2006-301030 describes a method of moving a center of gravity by position shifting per pixel unit. This method moves the center of gravity by controlling a cycle of a pixel and can move the center of gravity without adjustment such as PWM.

In the above conventional technology, however, a pixel position of less than one pixel is shifted by laser power modulation using PWM or current control at laser scanning to execute correction processing, thus removing the step of less than one pixel. Therefore, an image in which the density is expressed with roughness and closeness of a microdot, for example, one dot results in an event that the density is expressed with plural intermediate dots (two or more dots), leading to instability of dot formation.

FIGS. 16A, 16B and 16C show a state of a center-of-gravity movement using intermediate dots by laser power modulation. That is, FIGS. 16A, 16B and 16C show a state where a scan line is gradually shifted from right to left in that order. The curves shown in a broken line show exposure images which are generated by one laser scan and the curve shown in a solid line shows an exposure image including an influence of the neighboring laser exposure. This processing performs an interpolation center-of-gravity movement based upon a pixel shift amount from the laser scan position. The center-of-gravity certainly seems to gradually move to the left side while storing the integral value, but the generated forms of dots are not necessarily identical with each other, a difference of which may appear possibly as a change in density. Therefore, even if the density is saved based in light of a signal value or an integral light volume, the outputted image may not possibly maintain the density.

That is, even if the image subject to light emission by a light volume of 0.3 is adjacent to the image subject to that by a light volume of 0.7, it is difficult to realize the order of the same density as that subject to light emission by a light volume of one, and the possibility that the center-of-gravity is shifted by 0.3 is low. This means that the density save based upon the center-of-gravity shift by using intermediate dots is difficult.

The similar phenomenon also occurs in a line width of a thin line, and even if the same line width is realized in light of a signal value around processing the correction of less than one pixel, the line widths in the outputted thin lines possibly differ visually with each other.

FIG. 17A shows an example of correcting a center of gravity by position shifting per one pixel unit. In this case, the density tends to be easily saved, but in a case of desiring to draw a one-dot inclination line as shown in FIG. 17B, a region of not being scanned by a laser may be produced in an image formed as shown in FIG. 17C, thus generating a blank. In consequence, the inclination line is drawn in a broken line, which causes an image defect (broken line problem). When the drawing is made in this way, convex and concave portions may be visible depending on a level of resolution in image forming.

SUMMARY OF THE INVENTION

In order to solve the above issue, an image forming device according to the present invention is an image forming device including printing unit for printing an image by scanning a photosensitive body comprising: correcting unit for correcting a position in which the image is printed, wherein the correcting unit outputs one of a data of a line of interest, a data of a line adjacent to the line of interest, and an intermediate value between the line of interest and the line adjacent to the line of interest in accordance with a pixel shift amount and a main scan pixel position, and the printing unit scans the photosensitive body based upon the outputted data.

According to the present invention, in correcting a curve or an inclination of a scan line in a laser scan device, it is possible to realize correction processing which reduces unstable intermediate dots to be generated as compared to PWM or light volume control generally used, thereby providing better stability.

Further, a drawing position of a pixel is shifted to solve the broken line problem occurring upon correcting the curve of the scan line, thus making it possible to perform good image correction.

Further features of the present invention will become apparent from the following description of exemplary embodiments (with reference to the attached drawings).

BRIEF DESCRIPTION OF THE DRAWINGS

FIGS. 9A, 9B and 9C are diagrams showing a pixel position of a line changing point in a main scan direction and a directionality of the change until the next changing point;

FIG. 11 is diagrams each showing an edge detection operator;

FIGS. 15A, 15B, 15C, 15D and 15E are diagrams explaining a correcting method of less than one pixel;

DESCRIPTION OF THE EMBODIMENTS

Embodiment 1

Figure 4:
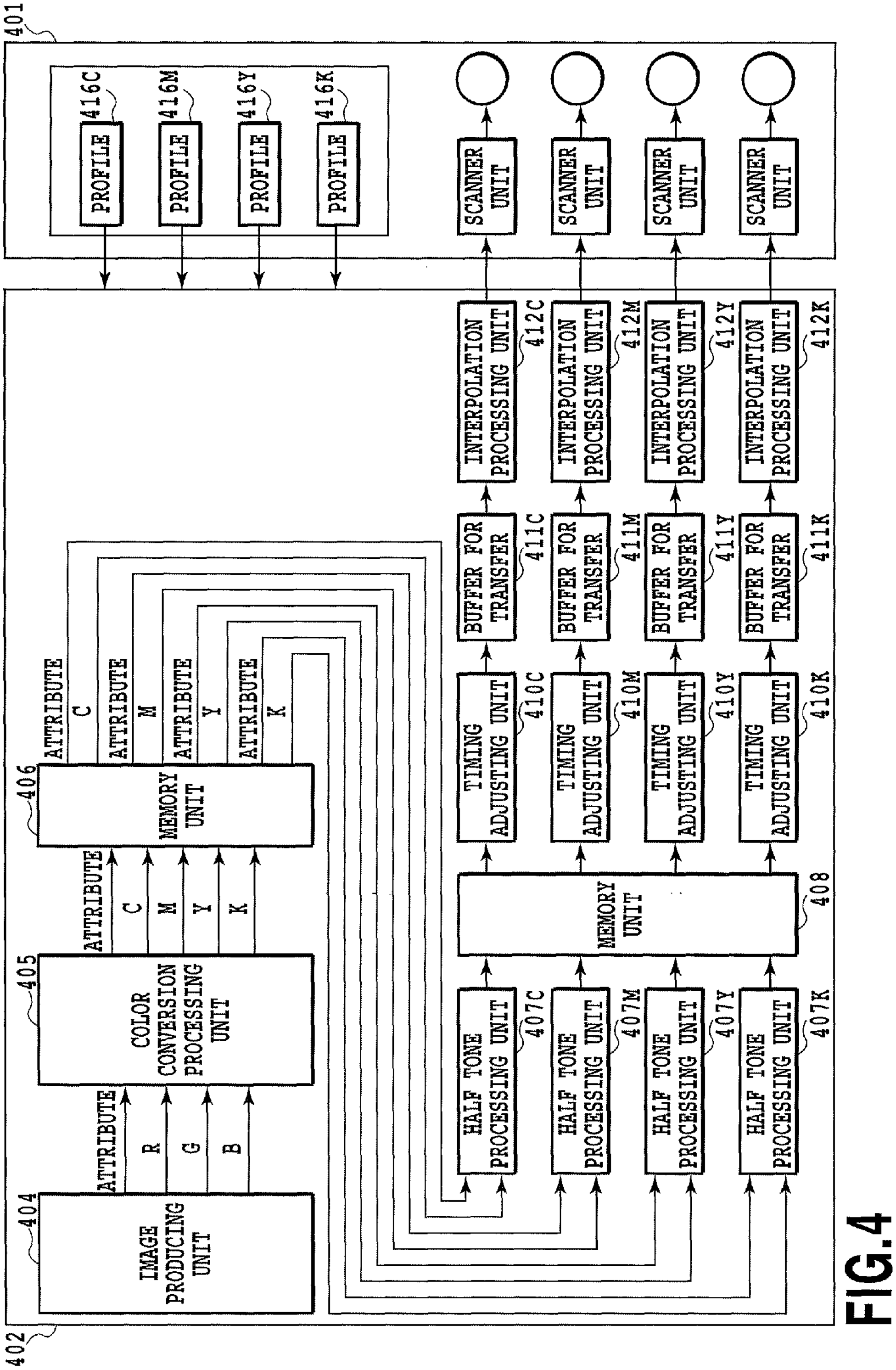
FIG. 4 is a diagram of each block relating to electrostatic latent image production in a color image forming device of an electronic photograph system according to Embodiment 1.

FIG. 4 is a diagram explaining each block relating to electrostatic latent image production in a color image forming device of an electronic photograph system according to Embodiment 1. The color image forming device includes an image forming unit 401 and an image processing unit 402, wherein the image processing unit 402 generates bit map image information and the image forming unit 401 performs image formation onto a print medium based upon the bit map image information.

Figure 2:
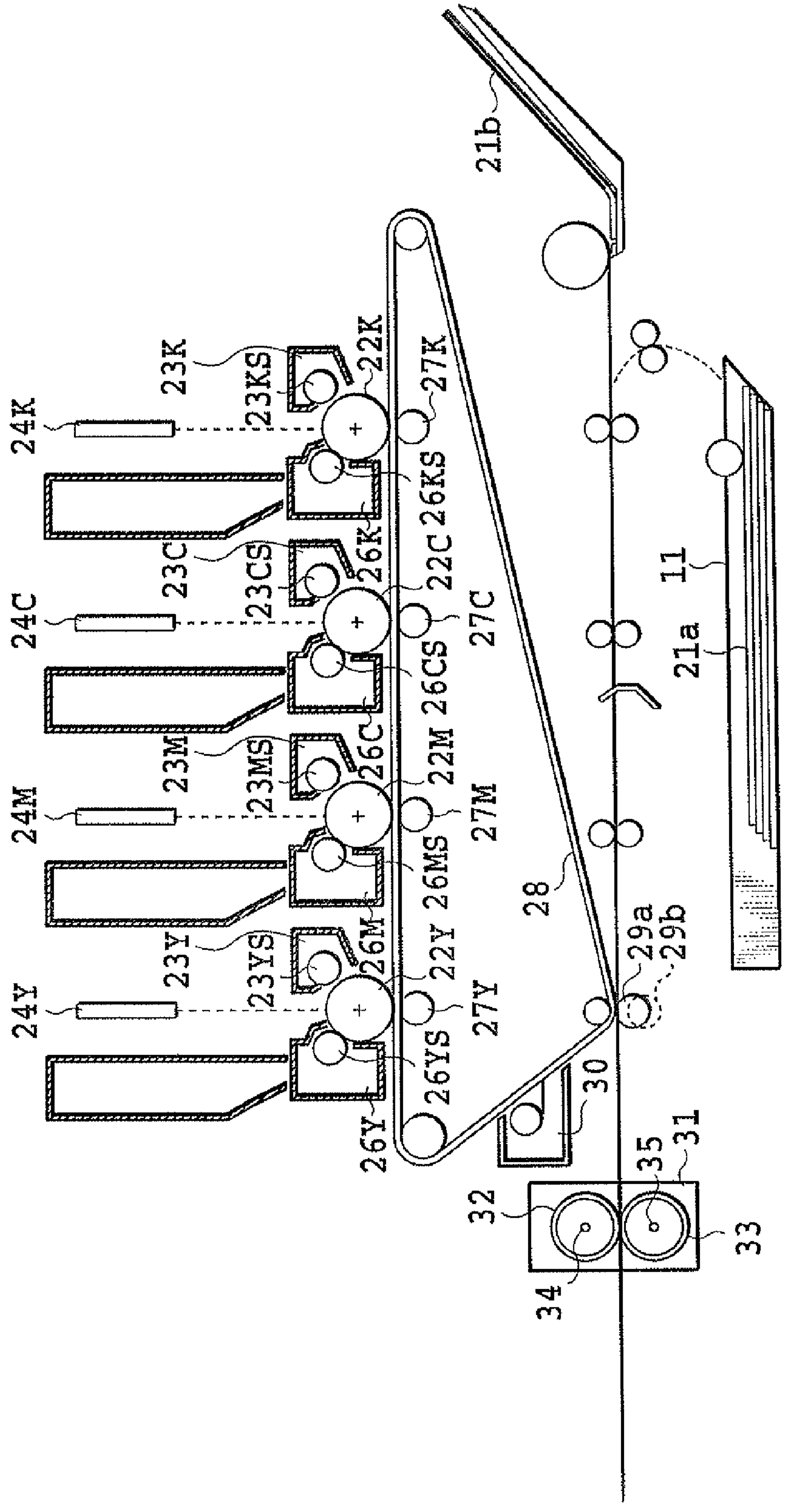
FIG. 2 is a diagram showing a structure of an image forming device according to the present invention.

FIG. 2 is a cross section of a color image forming device of a tandem system adopting an intermediate transfer body 28 as one example of the color image forming device of the electronic photograph system. By referring to FIG. 4, there will be explained an operation of the image forming unit 401 in the color image forming device of the electronic photograph system.

The image forming unit 401 drives exposure light in accordance with an exposure time processed at the image processing unit 402 to form an electrostatic latent image, which is developed to form a single-color toner image. The single-color toner images are overlapped to form a multi-color toner image, which is transferred onto a print medium 11 and the multi-color toner image is fixed on the print medium.

Charging unit includes four injection charging devices 23Y, 23M, 23C, and 23K for charging photosensitive bodies 22 (22Y, 22M, 22C, and 22K) in the respective colors of Y, M, C, and K. In addition, the respective injection charging devices have sleeves 23YS, 23MS, 23CS, and 23KS.

The photosensitive bodies 22 (22Y, 22M, 22C, and 22K) are rotated by transmission of a drive force of a drive motor (not shown), and the drive motor rotates the photosensitive bodies 22 (22Y, 22M, 22C, and 22K) in a counterclockwise direction in response to an image forming operation. Exposure unit emits exposure (laser) light onto the photosensitive bodies 22 (22Y, 22M, 22C, and 22K) by scanner units 24Y, 24M, 24C and 24K and exposes selectively surfaces of the photosensitive bodies 22 (22Y, 22M, 22C, and 22K), thereby forming the electrostatic latent image.

Developing unit, for visualizing the above electrostatic latent image, includes four, detachable developing devices 26Y, 26M, 26C, and 26K which develop in the respective colors of Y, M, C, and K. Further, the respective developing devices have sleeves 26YS, 26MS, 26CS, and 26KS.

Transfer unit transfers a single-color toner image from the photosensitive bodies 22 to the intermediate transfer body 28. The intermediate transfer body 28 is rotated in a clockwise direction to rotate the photosensitive bodies 22 (22Y, 22M, 22C, and 22K) and primary transfer rollers 27Y, 27M, 27C, and 27K positioned so as to be opposed to the photosensitive bodies 22, and thereby the single-color toner image is transferred. When an appropriate bias voltage is applied to the primary transfer roller and also a rotational speed of the photosensitive body is made to be different from that of the intermediate transfer body 28, the single-color toner image is transferred on the intermediate transfer body 28 efficiently. This is called a primary transfer.

Further, the transfer unit overlaps the single-color toner images over the intermediate transfer body 28 at each station, and then carries the multi-color toner image by the overlapping to secondary transfer rollers 29*a* and 29*b* with rotation of the intermediate transfer body 28. Further, the print medium 11 is carried from a paper feeding tray 21 to the secondary transfer rollers 29*a* and 29*b* with being sandwiched and the multi-color toner image on the intermediate transfer body 28 is transferred on the print medium 11. An appropriate bias voltage is applied to the secondary transfer rollers 29*a* and 29*b* to electrostatically transfer the toner image. This is called a secondary transfer. The secondary transfer roller abuts against the print medium 11 at a position of a code 29*a* while transferring the multi-color toner image on the print medium 11, and after printing processing, is spaced from the print medium 11 to be at a position of a code 29*b*.

Fixing unit is provided with a fixing roller 32 heating the print medium 11 and a pressure roller 33 pressing the print medium 11 on the fixing roller 32 for melting and fixing the multi-color toner image transferred on the print medium 11 to the print medium 11. The fixing roller 32 and the pressure roller 33 each are formed in a hollow shape and house heaters 34 and 35 therein. A fixing device 31 carries the print medium 11 holding the multi-color toner image by the fixing roller 32 and the pressure roller 33 and also applies heat and pressure to the print medium 11 to fix the toner on the print medium 11.

The print medium 11 after fixing the toner is thereafter discharged to a discharge paper tray (not shown) by a discharge roller (not shown) to complete the image forming operation. Cleaning unit 30 serves to clean the toner left on the intermediate transfer body 28, and the waste toner left after transferring the multi-color toner image of four colors formed on the intermediate transfer body 28 onto the print medium 11 is stored in a cleaner container.

Figure 3A:
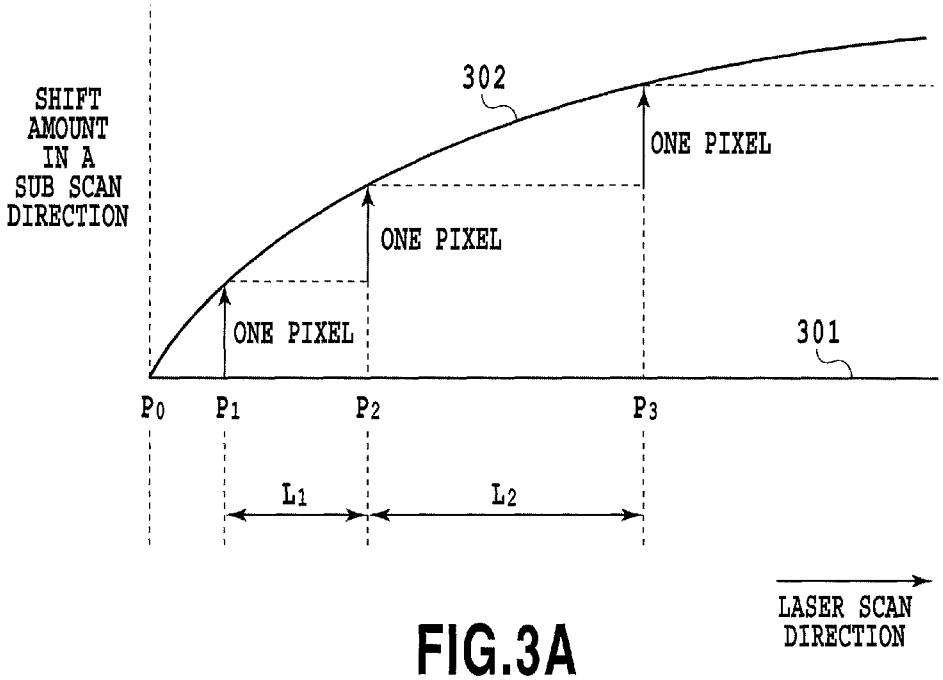
FIGS. 3A and 3B are diagrams each showing a profile characteristic of a scan line of the image forming device in each color.
Figure 3B:
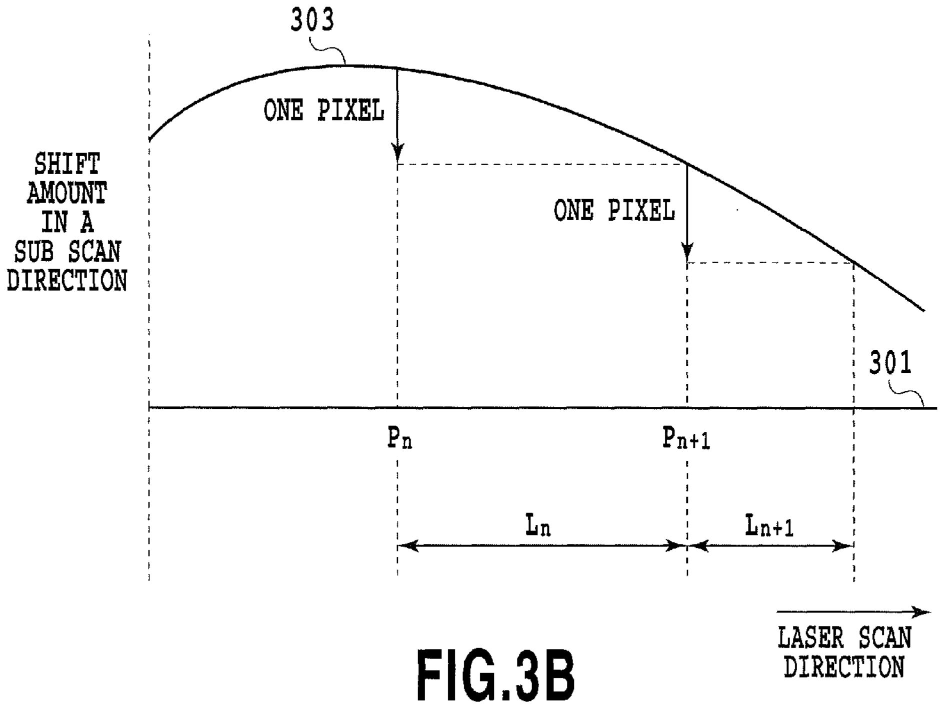

By referring to FIGS. 3A and 3B, a profile characteristic in a scan line of the image forming device in each color will be explained. FIG. 3A is a graph showing a region in which a profile characteristic in the image forming device is shifted upwards in a sub scan direction at the time of laser-scanning an photosensitive body in a laser-scan direction (main scan direction). FIG. 3B is a graph showing a region in which the profile characteristic in the image forming device is shifted downwards in the sub scan direction at the time of laser-scanning the photosensitive body in the laser-scan direction (main scan direction). In FIGS. 3A and 3B, the scan line 301 is an ideal scan line and shows a characteristic in a case where the scan is performed perpendicular to a rotation direction of the photosensitive bodies 22 (22Y, 22M, 22C, and 22K).

Figure 7A:
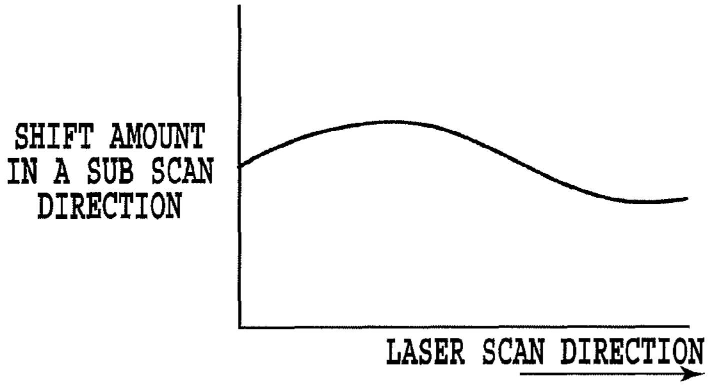
FIGS. 7A, 7B, 7C and 7D are graphs each showing a correlation between a direction to be corrected at an image processing unit 402 by a profile definition and a shift direction of an image forming unit 401.
Figure 7B:
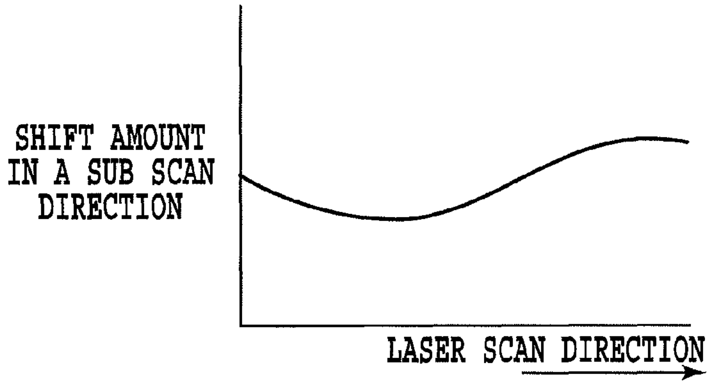
Figure 7C:
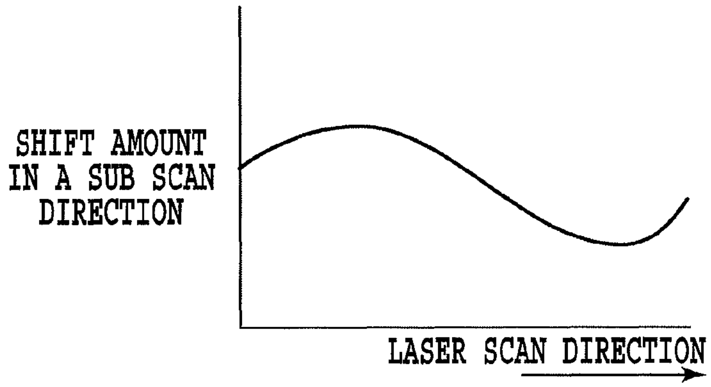
Figure 7D:
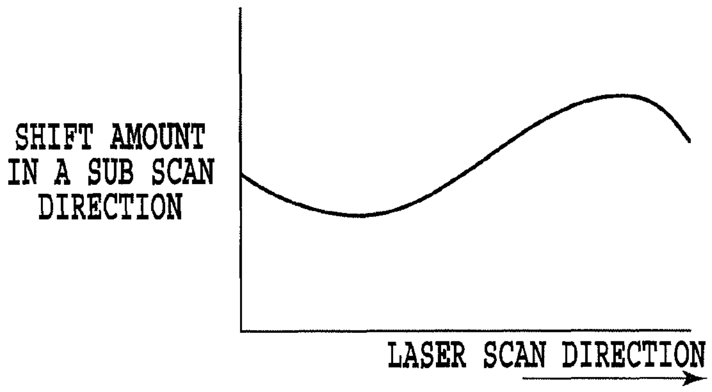

It should be noted that hereinafter, a profile characteristic in the explanation is defined based upon a direction in which the correction is to be made at an image processing unit 402, but the definition of the profile characteristic is not limited to this. That is, the profile characteristic may be defined as a shift direction of the image forming unit 401 where correction of the reverse characteristic is made at the image processing unit 402. FIGS. 7A, 7B, 7C and 7D show a correlation between a diagram showing a direction in which the correction is to be made at the image processing unit 402 and a shift direction of the image forming unit 401 by the profile definition. In a case where the profile characteristic as seen in FIG. 7A is shown as a direction in which the correction is to be made at the image processing unit 402, the curve characteristic of the image forming unit 401 is configured as shown in FIG. 7B, which has the reverse direction to that in FIG. 7A. In reverse, in a case where the profile characteristic as seen in FIG. 7C is shown as the curve characteristic of the image forming unit 401, a direction in which the correction is to be made at the image processing unit 402 is configured as shown in FIG. 7D.

The way of storing data of the profile characteristic is, as shown in FIGS. 9A, 9B and 9C, configured in such a manner as to store a pixel position of a line changing point in a main scan direction and directionality of a change until the next line changing point. More specially, by referring to FIGS. 9A, 9B and 9C as an example, line changing points $P_1$, $p_2$, $p_3$, $P_m$ (m is a positive integer) are defined in regard to the profile characteristic in FIG. 9A. It should be noted that in the following description, all suffixes of P are positive integers. The definition of each line changing point is a point (position in a main scan direction) where one pixel is shifted in a sub scan direction to an ideal scan line by a curve characteristic, and the direction may change in an upward direction until the next line changing point or may change in a downward direction until the next line changing point.

For example, the line changing point $P_2$ is a point where a line is to be changed in an upward direction until the next line changing point $P_3$. Therefore, a line changing direction in the line changing point $P_2$ is an upward direction (↑) as shown in FIG. 9B. Likewise, a line changing direction in the line changing point $P_3$ is also an upward direction (↑) until the next line changing point$_4$. A line changing direction in the line changing point $P_4$, which is different from the previous direction, is a downward direction (↓). The way of storing these directions, for example, if the data for showing the upward direction is set as "1" and the data for showing the downward direction is set as "0", is configured as shown in FIG. 9C. In this case, the data number to be stored is the same as the line changing point number. When the line changing point number is m pieces, the bit number to be stored is m bits.

FIGS. 3A and 3B show actual scan lines 302 and 303 in which an inclination and a curve are generated due to position accuracy and a diameter shift of a photosensitive body and due to a position accuracy of an optical system of the scanner units 24C, 24M, 24Y, and 24K of the respective colors shown in FIG. 2. In the image forming device, this profile characteristic differs in each printing device (printing engine), and further, in the color image forming device, the characteristic differs in each color.

By referring to FIG. 3A, at the time of laser-scanning a photosensitive body in a laser scan direction, a line changing point in a region which the scan line is shifted upwards in a sub scan direction by the curve characteristic will be explained.

The line changing point in the present invention shows a point where one pixel is shifted in a sub scan direction. That is, in FIG. 3A, each of points $P_1$, $p_2$, and $p_3$, where one pixel is shifted in the sub scan direction on the scan line 302 where the curve to the upward side occurs corresponds to a line changing point. It should be noted that in FIG. 3A, $P_0$ is described as a reference of a line changing point. As apparent from FIG. 3A, a distance ($L_1$ or $L_2$) between line changing points is shortened in a region where the scan line 302 in which the curve occurs rapidly changes and is lengthened in a region where the scan line 302 in which the curve occurs gradually changes.

Next, by referring to FIG. 3B, at the time of laser-scanning a photosensitive body in a laser scan direction, a line changing point in a region which a scan line is shifted downwards in a sub scan direction by the curve characteristic will be explained. Also in a region showing the characteristic where the scan line is shifted downwards, the line changing point is defined as a point where one pixel is shifted in the sub scan direction. That is, in FIG. 3B, each of points $P_n$, and $p_{n+1}$, where one pixel is shifted in the sub scan direction on the scan line 303 showing a curve characteristic to a downward side corresponds to a line changing point. Also in FIG. 3B, in the same way as in FIG. 3A, a distance ($L_n$ or $L_{n+1}$) between line changing points is shortened in a region where the scan line 303 in which the curve occurs rapidly changes and is lengthened in a region where the scan line 303 in which the curve occurs gradually changes.

In this way, the line changing point has a close relationship with a changing degree of the scan line showing the curve characteristic in the image forming device. In consequence, the image forming device with a rapid curve characteristic has many line changing points, and on the other hand, the image forming device with a gradual curve characteristic has less line changing points.

As explained above, since the curve characteristic in the image forming device differs also in each color, the number and the position of the line changing point differ also in each color. The difference in the curve characteristic between colors causes a registration shift to occur in an image where a toner image of all colors is transferred on the intermediate transfer body 28. The present invention relates to interpolation processing for restricting a step at this line changing point, and a detail thereof will be explained later with reference to another drawing.

Next, by referring to FIG. 4, the processing of the image processing unit 402 in the color image forming device will be explained. An image producing unit 404 produces a printable, raster image data by a print data received from a computer device (not shown) or the like, and outputs the raster image data as RGB data and an attribute data showing a data attribute of each pixel, for each pixel. It should be noted that the image producing unit 404 handles not the image data received from the computer device or the like, but may include reading unit inside the color image forming device to handle an image data from the reading unit. Here, the reading unit includes at least a CCD (charge couple device) or a CIS (contact image sensor). In addition, the reading unit may include a processing unit for executing predetermined image processing to the read image data. Further, the image forming device may receive data through an interface (not shown) from the above reading unit.

A color conversion processing unit 405 converts the above RGB data into data of CMYK in accordance with a toner color of the image processing unit 402 and stores the data of CMYK and the attribute data in a memory unit 406. The memory unit 406 is a first memory unit in the image processing unit 402, and once stores a raster image data for print processing. It should be noted that the memory unit 406 may be a page memory for storing image data corresponding to an amount of one page or may be a band memory for storing data corresponding to an amount of plural lines.

Half tone processing units 407 (407C, 407M, 407Y, and 407K) execute half tone processing to the attribute data and the data of the respective colors outputted from the memory unit 406.

A second memory unit 408 in the image forming device stores N-value processed data processed by the half tone processing units 407 (407C, 407M, 407Y, and 407K). It should be note that in a case where a pixel position in image processing subsequent to the memory unit 408 is a line changing point, a line change corresponding to an amount of one pixel is made at a point where the data is read out from the memory unit 408.

Figure 8A:
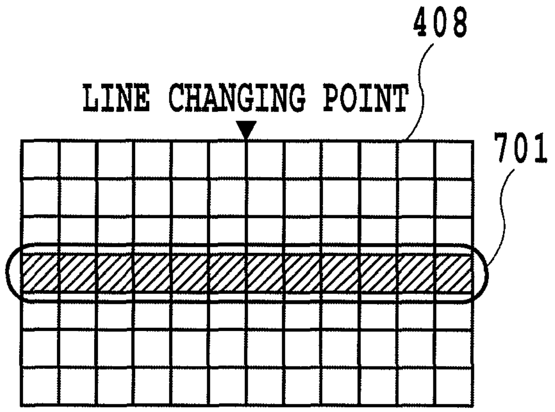
FIGS. 8A, 8B and 8C are schematic diagrams each showing a state of data stored in a memory unit 408.
Figure 8B:
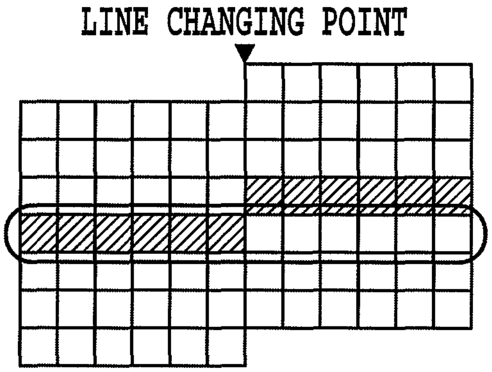
Figure 8C:
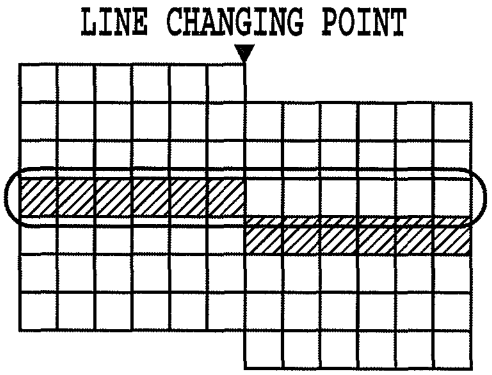

FIG. 8A is a schematic diagram showing a state of the data stored at the memory unit 408. As shown in FIG. 8A, in a state of being stored at the memory unit 408, the data after being processed by the half tone processing unit are stored not depending on the correction direction as the image processing unit 402 or the curve characteristic of the image forming unit 401. In a case where a profile characteristic as a direction to be corrected at the image processing unit 402 is in an upward direction at a point where a line 701 in FIG. 8A is read out, the line is, as shown in FIG. 8B, shifted upwards by one pixel from the line changing point as a boundary. In addition, in a case where a profile characteristic as a direction to be corrected at the image processing unit 402 is in a downward direction, at a point where the image data in the line 701 are read out from the memory unit 408, the line is, as shown in FIG. 8C, shifted by one pixel downwards from the line changing point as a boundary.

Timing adjusting units 410 (410C, 410M, 410Y, and 410K) adjust timing for reading out the N-value processed data from the memory unit 408. Buffers 411 (411C, 411M, 411Y, and 411K) for transfer temporarily store the output data from the timing adjusting units 410 (410C, 410M, 410Y, and 410K). It should be noted that the first memory unit 406, the second memory unit 408, and the buffers 411 (411C, 411M, 411Y, and 411K) for transfer are provided as external units at the above description, but a common memory unit may be provided in the image forming device.

Figure 5:
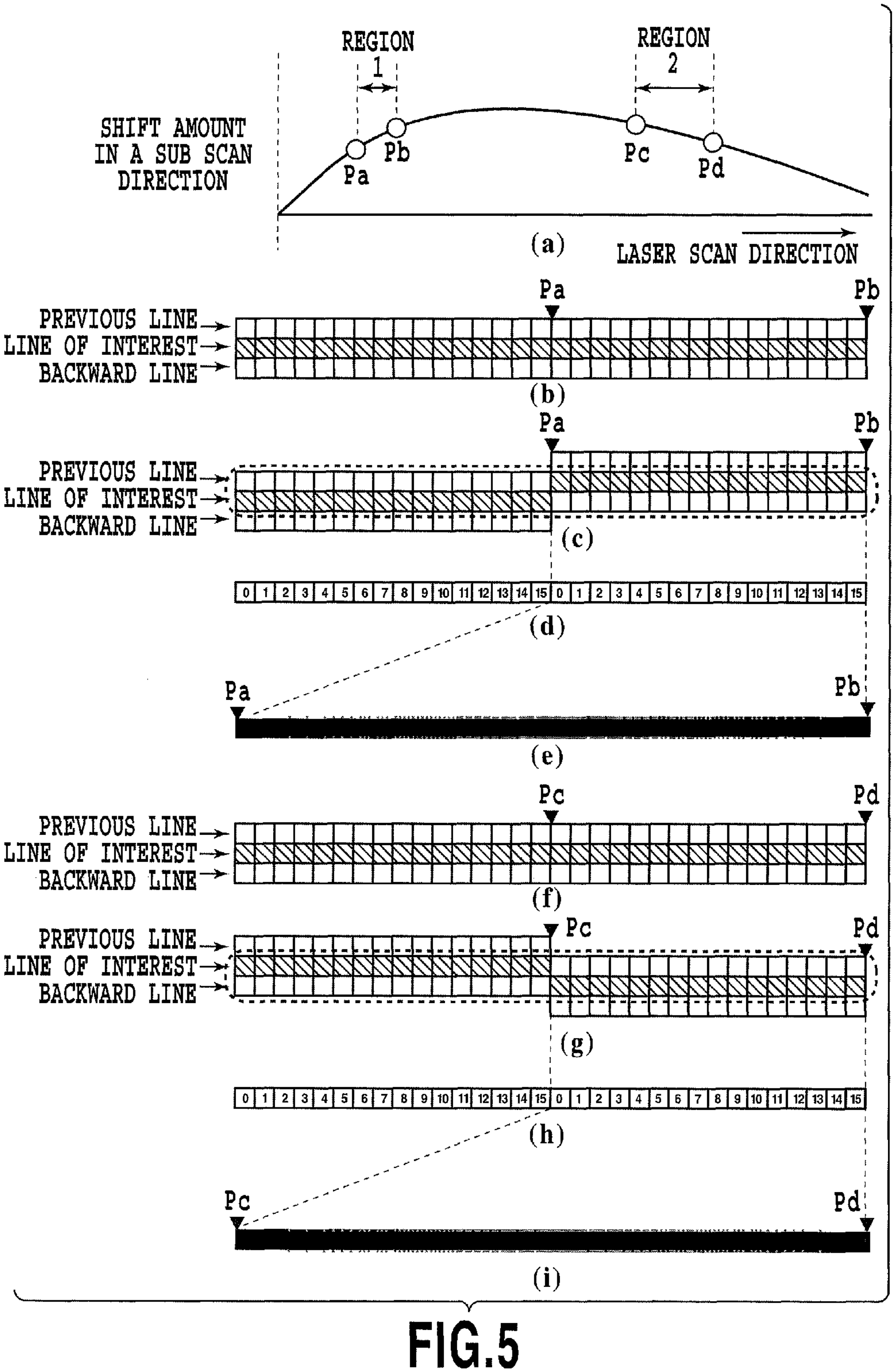
FIG. 5 is diagrams showing a curve characteristic and a correction method of the image forming device in a laser scan direction.

Interpolation processing units 412 (412C, 412M, 412Y, and 412K) execute interpolation processing to data received from the buffers 411 (411C, 411M, 411Y, and 411K) for transfer. The interpolation processing at the interpolation processing units 412 (412C, 412M, 412Y, and 412K) use pixels around the line changing point corresponding to the curve characteristic in the image forming device. FIG. 5 shows a method of interpolation in the line changing point.

FIG. 5(*a*) shows a curve characteristic in the image forming device to a laser scan direction. In FIG. 5(*a*), a region 1 is a region where the correction is required to be made upwards at the image processing unit 402, and in reverse, a region 2 is a region where the correction is required to be made downwards at the image processing unit 402.

FIG. 5(*b*) shows an image before changing a line around the line changing point $P_a$, that is, output image data of the half tone processing units 407 (407C, 407M, 407Y, and 407K). A line of interest is a central line among the image data corresponding to three lines shown in the figure.

FIG. 5(*c*) shows line changing processing of one pixel unit in a case of paying attention on the line of interest, that is, image data at the output time of the memory unit 408. Since the line changing point processing exceeding one pixel is executed at a point of reading out the image data from the memory unit 408, a large step appears in the line changing point $P_a$ as a boundary in pixels around the line changing point $P_a$ at a point of inputting the image data to the interpolation processing unit.

It should be noted that since the line changing point is defined as a position where one pixel is shifted in a sub scan direction to a laser scan direction, the following explanation will be made assuming that the reference position at interpolation is in a left side.

The interpolation processing units 412 (412C, 412M, 412Y, and 412K) each execute interpolation processing to the image data appearing as a step on the line of interest.

First, a section between line changing points is divided into n areas. Here, for simple explanation, the division will be explained as the equal division of 16 areas, but is not limited to this division without mentioning. Since a direction of the correction in a region 1 in FIG. 5(*a*) is an upward side, the output in the line of interest is realized by selecting either of three data composed of the input line of interest, a backward line, and an intermediate value found from both of the line of interest and the backward line, and both of them.

FIG. 5(*d*) shows a table composed of a pixel shift amount of less than an integer pixel at each area. That is, the pixel is shifted per 16-pixel unit by a value shown in a table in FIG. 5(*d*). For example, 1/16 pixels are meant to be shifted in an area 1. Likewise, 2/16 pixels are shifted in an area 2. Thus the pixel is shifted in the order of the area number, and finally, 15/16 pixels are shifted in an area 15. In this way, it is possible to execute the processing for interpolation center-of-gravity movement between the line changing points.

In the present embodiment, the line of interest, the backward line and an average value line between both of the lines are produced and the three lines are periodically selected, thus realizing the processing for the center-of-gravity movement. This average value line means an intermediate position between both of the lines and a position corresponding to half movement of the center-of-gravity. In addition, production of the average value (intermediate value of ON and OFF) requires PWM or control of a laser light volume. In case of PWM, control of 50% lighting is performed for producing the intermediate value.

Figure 1:
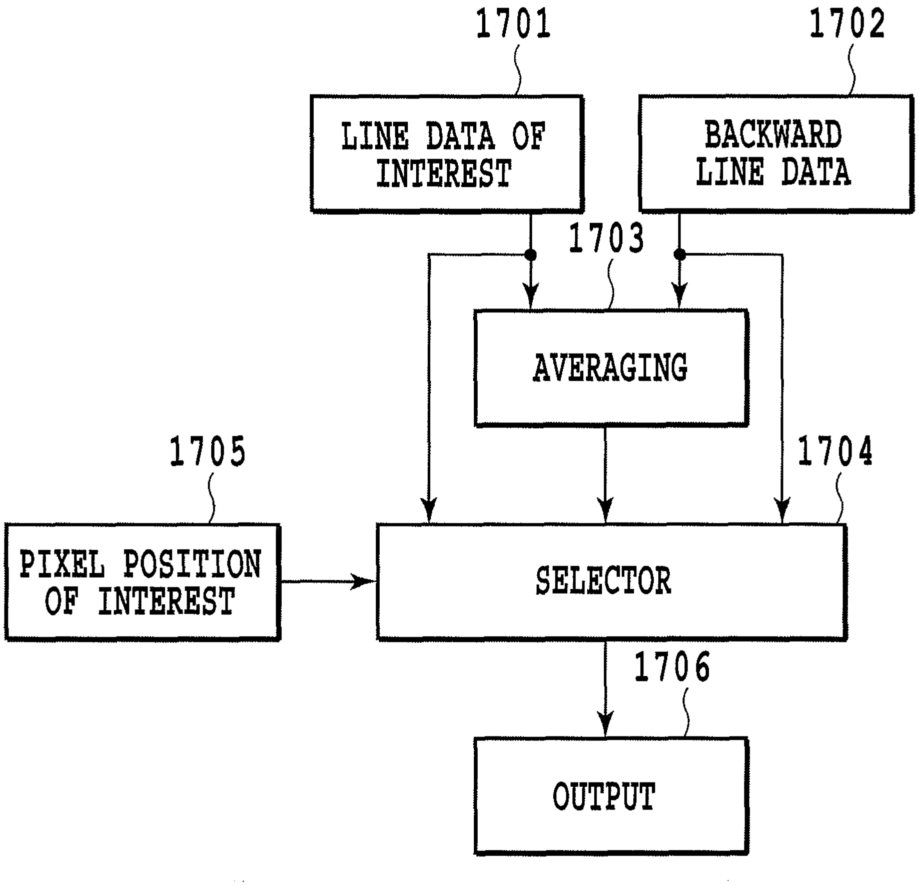
FIG. 1 is a block diagram of interpolation processing according to Embodiment 1.
Figure 6:
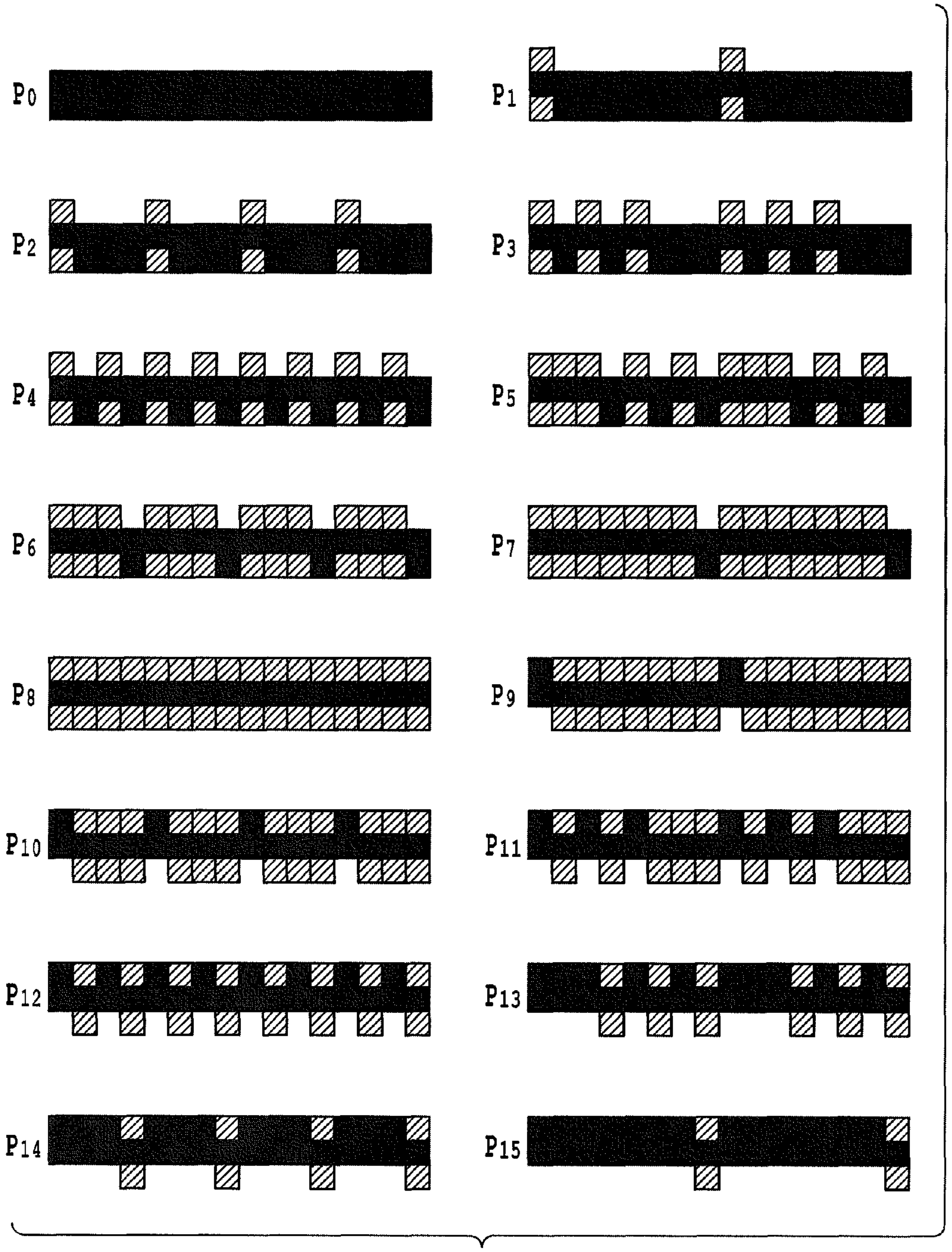
FIG. 6 is diagrams each showing a state in each area of the interpolation processing according to Embodiment 1.

FIG. 1 shows a block diagram of the interpolation processing in the present embodiment. A line data of interest 1701 and a backward line data 1702 are inputted, and an average value thereof is calculated by averaging 1703. A line is selected from the three lines of the average value, the line of interest and the backward line based upon a pixel position (coordinate) of interest 1705 by a selector 1704, which is outputted to output 1706. Here, the section between the line changing points is equally divided into 16 areas, but is not limited this without mentioning. The processing is executed while changing the selection period in each area. FIG. 6 shows an example of the selection order. A location shown in a hatched line in FIG. 6 means an average value output between the upper and lower pixels.

Numerals of 0 to 15 used as suffixes in FIG. 6 correspond to table values in each section in FIG. 5(*d*). The value of the suffix in FIG. 6 shows a selection state from the line of interest, the backward line and the average value in the lateral 16-pixel.

When the intermediate dot found by the average value is thus put in the middle of the selecting, the discontinuity or the convex and concave portions as raised as the issue are reduced. Formation of the exposure dot also can be relatively stably performed if the dot is composed of the intermediate value, and it is possible to maintain the density of the isolated dot or stably reproduce the line width of the thin line, which is the issue.

It should be noted that here, the average value between the upper and lower lines is used as the average value, but the average value is not limited to this as long as it is an intermediate density value found from the upper and lower lines.

In regard to a selecting method of the three data, for example, when either one of the upper and lower lines is selected with a remainder found by dividing a pixel position of interest in a main scan direction by 16, periodical shift center-of-gravity movement is possible. (the remainder can have a value among 0 to 15, and one of the upper and lower lines is selected with the remainder)

FIG. 5(*e*) shows a macroscopic high angle view of the shifted state. Running-off of a pixel and frequency thereof gradually change per pixel unit, and finally, the image center-of-gravity is shifted by an amount of one line.

Next, a region 2 in FIG. 5(*a*) where the correction is required to be made downwards will be explained. In the downward correction, a weighing coefficient used in calculation of a correction pixel value is set in the line of interest and a previous line of the line of interest.

FIG. 5(*f*) shows an image data at the output time of the half tone processing unit 407 (407C, 407M, 407Y, or 407K). In addition, FIG. 5(*g*) shows an image data at a point where the data is read by the memory unit 408. Since the downward correction is made in the line changing point $P_c$, a line changing processing step exceeding one pixel occurs from the line changing point $P_c$ as a boundary as shown in FIG. 5(*g*).

FIG. 5(*h*) is a table showing selection frequency after the area division is made in the same way as the previous upward interpolation. However, the selection, which is different from that of the upward interpolation, is made between the line of interest and the previous line and also the frequency refers to frequency in the previous line. A table value shows a pixel shift amount of less than an integer pixel from an ideal position in the same way as the previous upward interpolation, and the processing of an interpolation center-of-gravity movement between the line changing points in a downward side is executed.

FIG. 5(*i*) is a macroscopic high angle view of the shifted state.

In this way, the output at the line of interest is realized by selecting either of the three data composed of the line of interest of the input, the line adjacent to (before or after) the line of interest, and the intermediate value determined from both of them, thereby making it possible to smooth the step at the line changing processing on top of solving the broken line problem by a simple circuit structure.

That is, the interpolation processing in the interpolation processing unit prevents, whether the direction of the interpolation is an upward side or a downward side, the continuous image data in a main scan direction from being generated as a large step due to the line changing processing step exceeding one pixel.

It should be noted that the interpolation processing unit may include another construction which is different from the construction in which the line data of interest, the backward (adjacent) line data, and the average (intermediate value) data are, as shown in FIG. 1, prepared, and a desired data is selected from the data by the selector.

That is, the interpolation processing unit may include the construction for producing and outputting the average (intermediate value) data only in a case where the average (intermediate value) data is necessary in response to the pixel position in the main scan direction. In other words, it is sufficient only if the interpolation processing unit can selectively output the line data of interest, the backward (adjacent) line data, and the average (intermediate value) data. It should be noted that the profile characteristic data already explained by referring to FIGS. 9A, 9B and 9C is stored in the image forming unit 401 as the characteristic of the image forming device. In the present embodiment, the image processing unit 402 executes the processing in accordance with the characteristic of the profile 416C, 416M, 416Y, or 416K stored at the image forming unit 401.

It should be noted that the present embodiment shows an example where the image processing is executed by the period and frequency control per one pixel unit, but the similar effect can be obtained even with the processing using a unit such as two-pixel or eight-pixel depending on the mounting without mentioning. In addition, the present embodiment shows an example of correcting the curve and the inclination relative to an ideal, straight position of the scan line to ideally make the correction, but is not limited thereto. For example, the processing of K may be omitted by correcting CMY toward the curve and the inclination of K in CMYK. That is, the correction per one pixel unit or the correction of less than one pixel is not made for matching the image data of CMYK to the ideal characteristic, but the correction per one pixel unit or the correction of less than one pixel may be made for matching each image of YMC to the image of the other K.

Embodiment 2

As described above, the half tone processing units 407 (407C, 407M, 407Y, and 407K) execute the half tone processing to the attribute data and the data of the respective colors outputted from the memory unit 406. A specific example of the half tone processing includes screen processing or error dispersion processing.

The screen processing executes N-value processing of input image data using predetermined plural matrixes.

In addition, the error dispersion processing executes N-value processing by comparing the input image data with a predetermined threshold value to disperse a difference between the input image data and the output image data at that point to the peripheral pixels which are subject to N-value processing subsequently.

In a case of forming a half tone image by the error dispersion processing, the processing including the random number is usually executed at the time of expressing an intermediate tone and the density is expressed at a random pattern to form an image. Therefore, the image does not have periodicity and when the processing described in Embodiment 1 is executed over an entire region of the image, the processing for the interpolation center-of-gravity movement with the smooth step by the line changing processing becomes possible.

However, in a case of forming a half tone image using the screen processing, an intermediate tone is expressed with a periodical dot pattern in accordance with the line number and the angle of the screen. When the line changing processing and the interpolation processing described in Embodiment 1 are executed, the periodicity is possibly disrupted independently for the respective colors (CMYK) to degrade an image quality at that location. However, at a location of the high density, particularly the solid drawing, if the processing for the aforementioned interpolation center-of-gravity movement is not executed even in a case of the image where the screen processing is executed, the step is highly visible. Therefore, it is determined whether the pixel before or after the line changing point of the N-value processed data is a pixel requiring an interpolation at the post processing or a pixel not requiring the interpolation.

Figure 10:
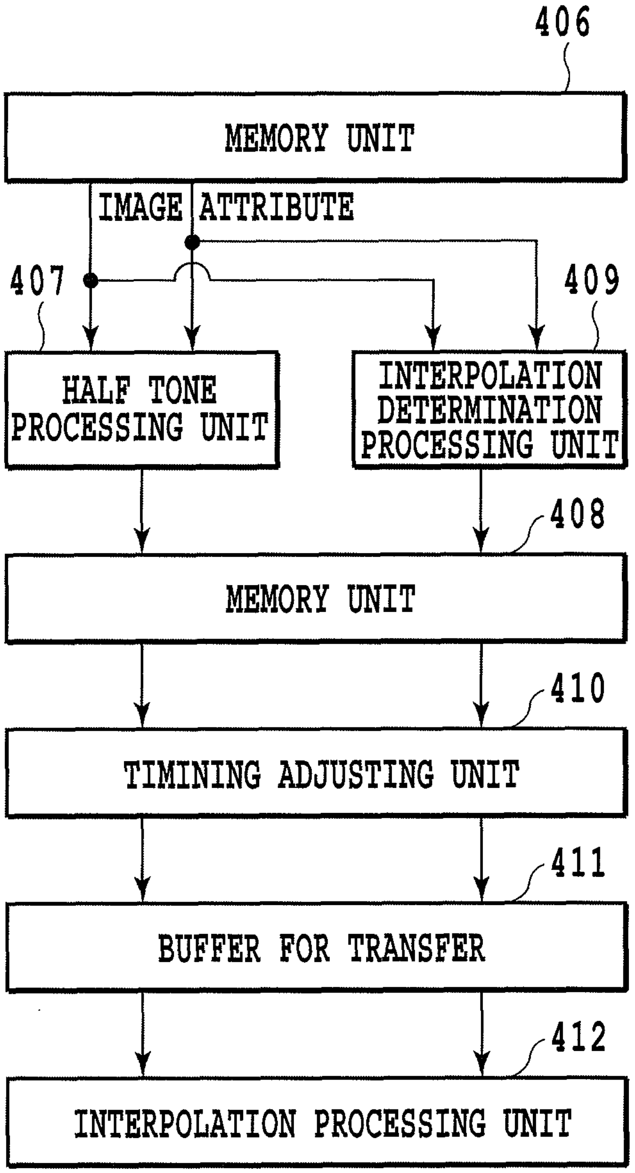
FIG. 10 is a processing block diagram according to Embodiment 2.

FIG. 10 shows a block diagram of extracting a flow corresponding to one color from FIG. 4. Hereinafter, an outline of an interpolation determination processing unit 409 as to whether to perform the interpolation will described.

Edge detecting processing is executed independently in each of CMYK to an intermediate tone (multi-value) image before forming an image. In this case, since the line changing direction is a sub scan direction, it is required to detect an edge in the sub scan direction, that is, only a lateral edge. FIG. 11 shows samples each showing an edge detecting operator with pixels of a matrix of 3×3. The filter processing as shown in the figure is executed to the image to detect the pixels more than a given threshold value as edge pixels.

The pixel position thus edge-detected is stored as a flag, and next, the half tone processing using the screen processing is executed.

The timing adjusting units 410 (410C, 410M, 410Y, and 410K) synchronize the N-value processed data from the memory unit 408 with the determination result of the interpolation determination processing unit 409. The buffers 411 (411C, 411M, 411Y, and 411K) for transfer temporarily store the output data of the interpolation determination processing unit 409 and the timing adjusting units 410 (410C, 410M, 410Y, and 410K).

When the processing for the interpolation center-of-gravity movement is switched to be executed per pixel unit, the periodical dot pattern of the screen is not disturbed and also the smooth image can be obtained without the step at the highly dense edge portion where the step tends to be easily visible.

Embodiment 3

In the Embodiment 1 and Embodiment 2, if the main scan direction is the same, the same shift processing is executed in the sub scan direction without fail, but in Embodiment 3, the shift position is changed for each sub scan. As described in Embodiment 1, when the upper and lower lines are referred to by using the remainder of the main scan pixel position, the same reference relation is made in the same main scan position without fail. In consequence, the line is uniformly shifted in the sub scan direction. Therefore, the uniformity is disrupted by providing random components thereto to weaken the visibility as a streak.

More specially the disturbance is applied to the remainder of the main scan pixel position described in Embodiment 1. Here, in considering the timing of applying the disturbance, when the disturbance is applied uniformly to all pixels, the density can not be possibly stored before or after the interpolation. Therefore, the disturbance is generated only one time at the time the scan steps over the 16-divided area during scanning and the value is commonly used within the area. In this way, since the selection frequency for the upper and lower lines can be stored while disrupting the uniformity in the sub scan direction, the density around the interpolation processing can be stored.

Figure 12:
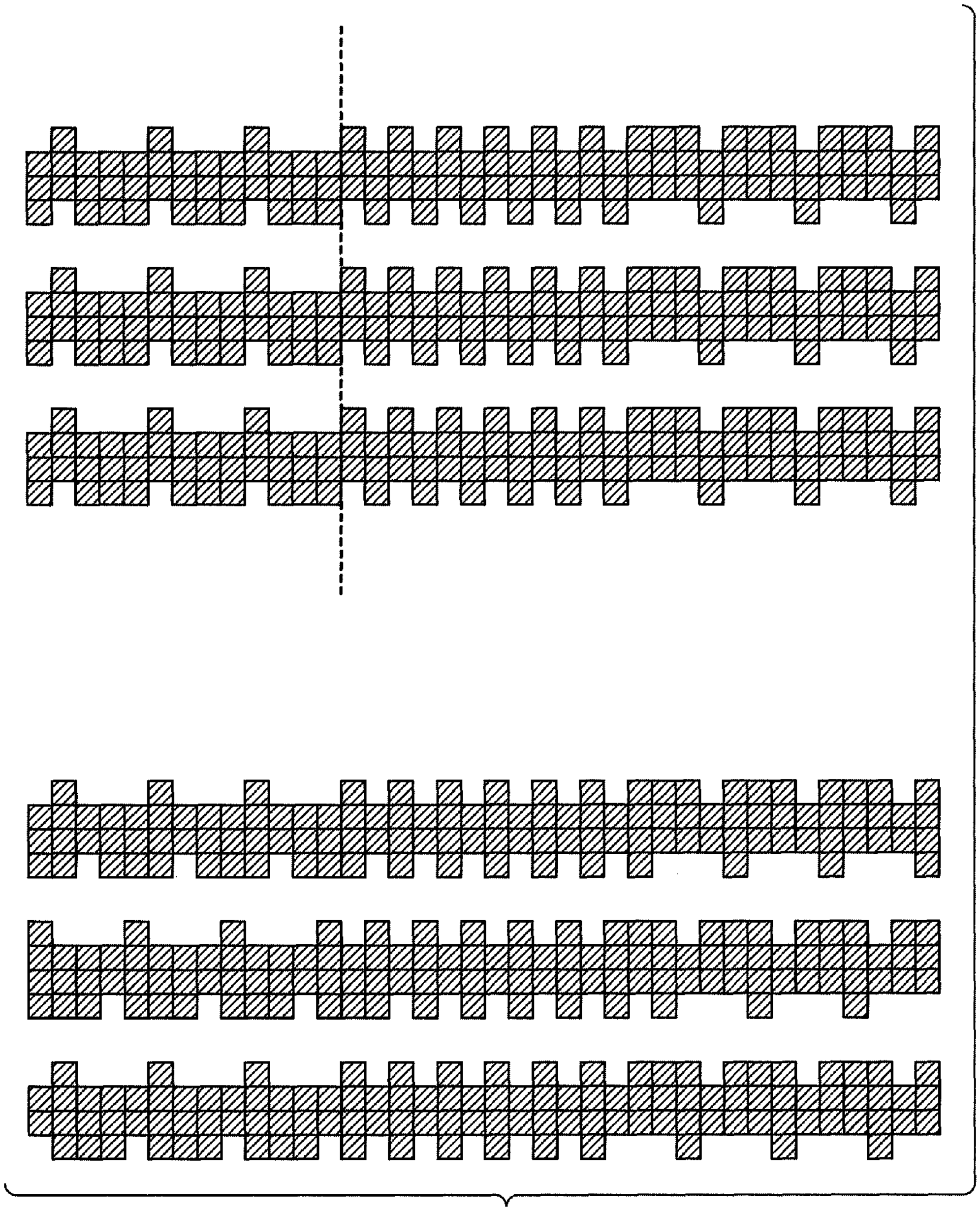
FIG. 12 is a schematic diagram showing a flow of images according to Embodiment 3.
Figure 13A:
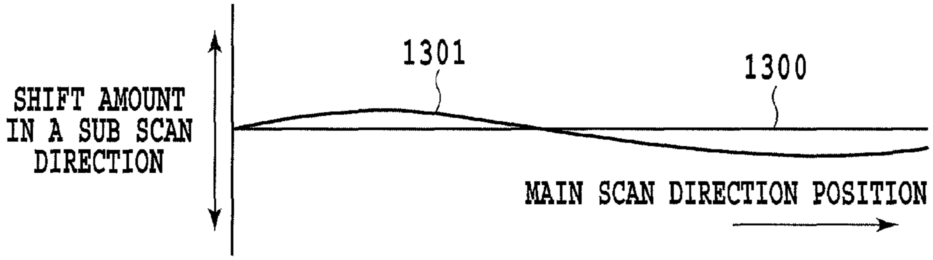
FIGS. 13A, 13B, 13C and 13D are diagrams each showing an example of a curve profile of a scan line.
Figure 13B:
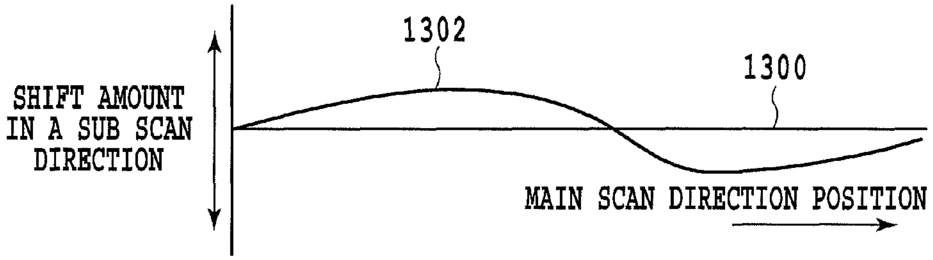
Figure 13C:
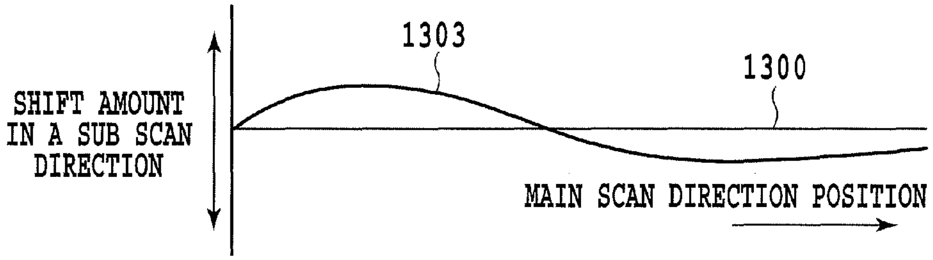
Figure 13D:
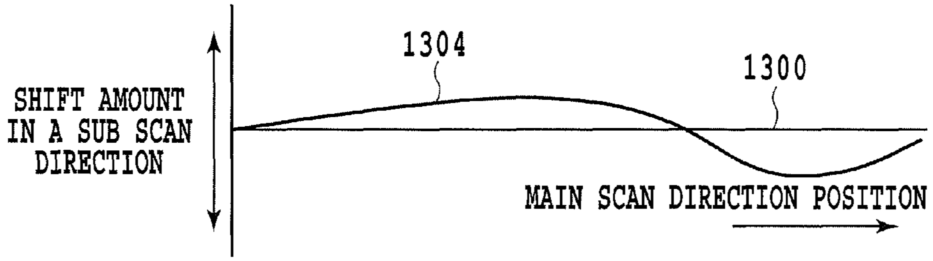
Figure 14:
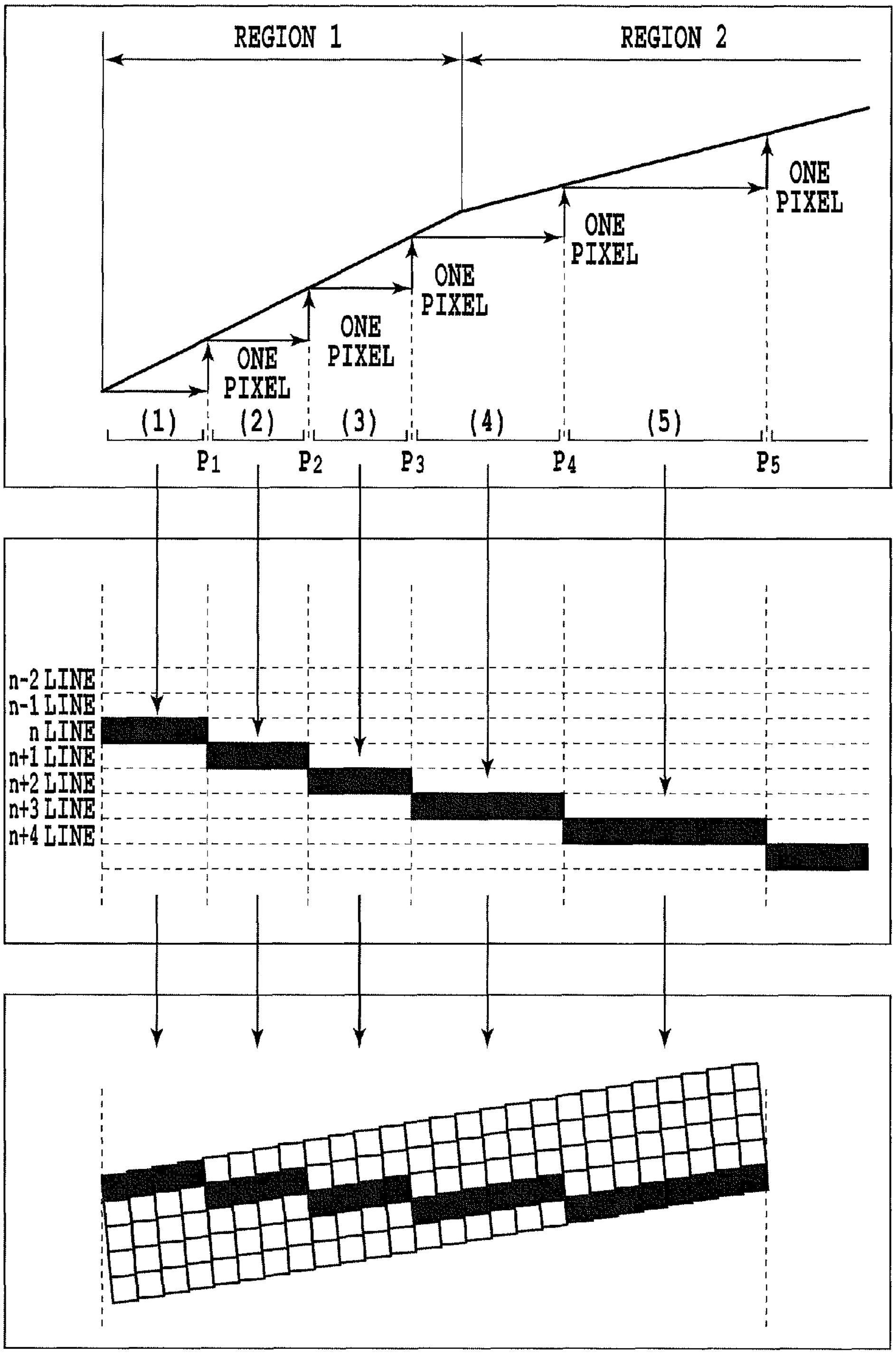
FIG. 14 is diagrams showing an example of an attribute determination result and an interpolation determination result of each color.
Figure 16A:
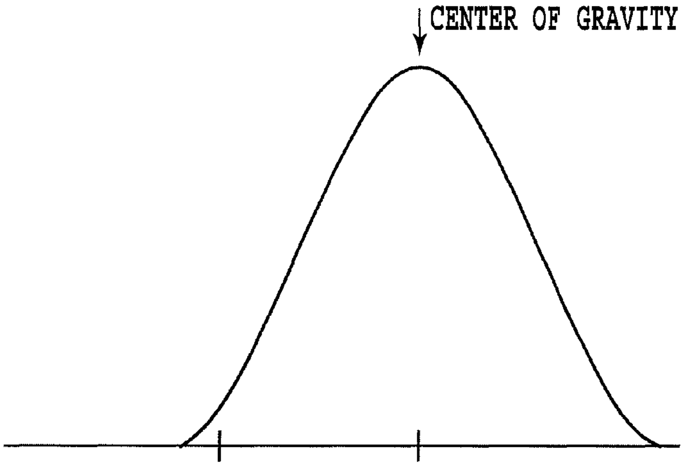
FIGS. 16A, 16B and 16C are schematic diagrams each showing an exposure state of dots by a laser.
Figure 16B:
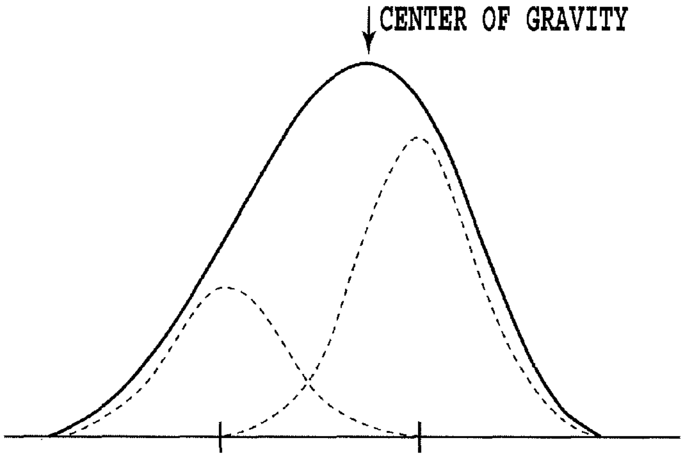
Figure 16C:
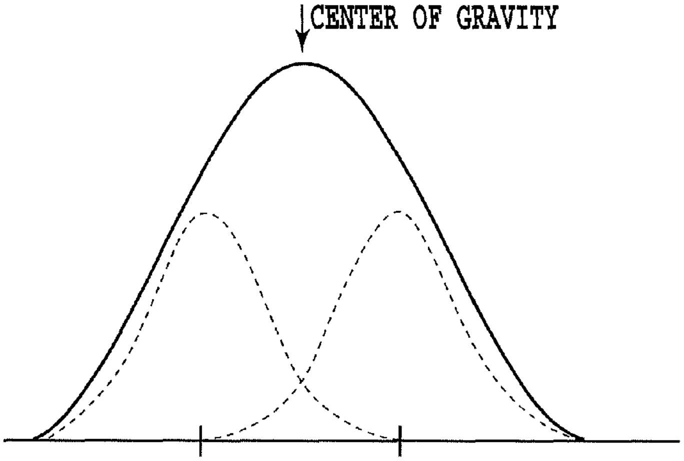
Figure 17A:
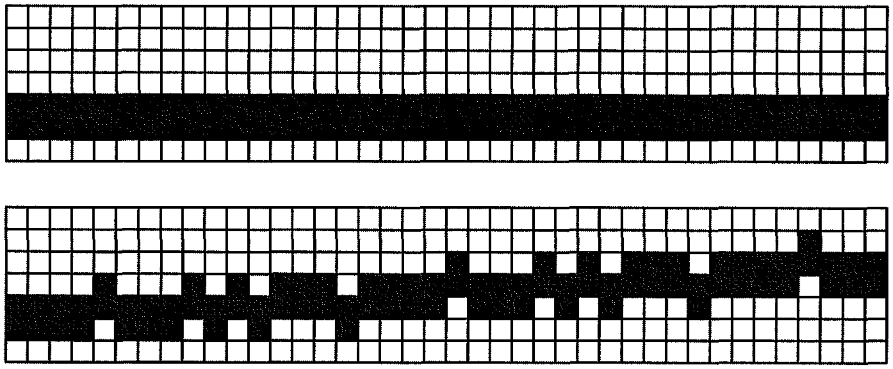
FIGS. 17A, 17B and 17C are sample diagrams of performing a center-of-gravity movement by shifting an image position.
Figure 17B:
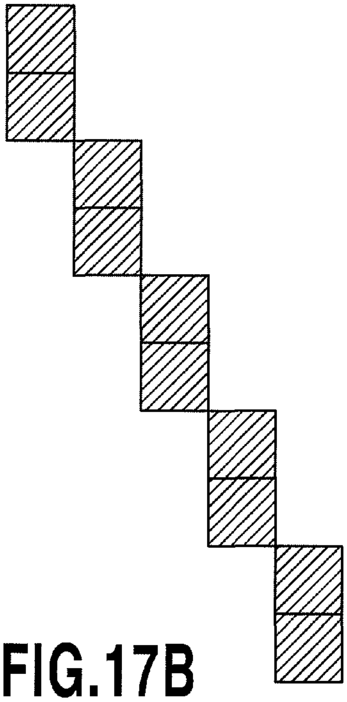
Figure 17C:
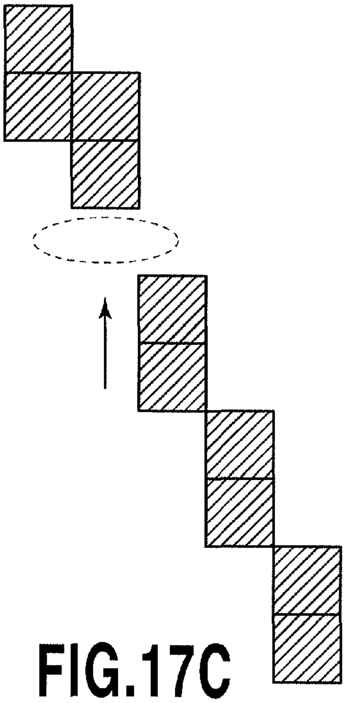

FIG. 12 shows the state of the streak visibility. An upper diagram in FIG. 12 shows an example where the streak is visible since the main scan pixel positions of the lines are in agreement, and a lower diagram in FIG. 12 shows an example where the line shift start positions of the lines during scanning are disturbed for each sub scan. Since the period operation is thus disturbed, the streak visibility in the lower diagram in FIG. 12 is weakened.

Other Embodiment

In addition, an object of the present invention is achieved by reading and executing by a computer a program code for realizing the procedure of the processing shown in the above embodiment from the storage medium in which the program code is stored. In this case, the program code itself read out from the storage medium is to realize the function of the aforementioned embodiment. Therefore, the program code or the storage medium in which the program code is stored can also constitute the present invention.

Examples of the storage medium for supplying the program code may include a floppy (registered trademark) disc, a hard disc, an optical disc, an optical magnetic disc, a CD-ROM, a CD-R, a magnetic tape, an involatile memory card, a ROM and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-122623 filed May 8, 2008 which is hereby incorporated by reference herein in its entirety.

What is claimed is:

1. An image forming apparatus comprising:

an obtaining unit configured to obtain a curve amount at a position of a target area in a main scan direction, wherein the target area consists of a plurality of successive pixels in a main scanning direction; and a correcting unit configured to correct a value of each pixel included in the target area in accordance with the obtained curve amount, wherein the correcting unit corrects a value of each pixel included in the target area to only 0 percent, 50 percent or 100 percent, and wherein the target area corrected by the correcting unit has a periodical pixel pattern.

2. An image forming method comprising the steps of:

obtaining a curve amount at a position of a target area in a main scan direction, wherein the target area consists of a plurality of successive pixels in a main scanning direction; and correcting a value of each pixel included in the target area in accordance with the obtained curve amount, wherein in the correcting step, a value of each pixel included in the target area are corrected to only 0 percent, 50 percent or 100 percent, and wherein the target area corrected by the correcting step has a periodical pixel pattern.

3. A non-transitory computer-readable storage medium storing a program causing a computer to execute an image forming method, the image forming method comprising the steps of:

obtaining a curve amount at a position of a target area in a main scan direction, wherein the target area consists of a plurality of successive pixels in a main scanning direction; and correcting a value of each pixel included in the target area in accordance with the obtained curve amount, wherein in the correcting step, a value of each pixel included in the target area are corrected to only 0 percent, 50 percent or 100 percent, and wherein the target area corrected by the correcting step has a periodical pixel pattern.

* * * * *